US009116915B1

(12) United States Patent
Lakshman et al.

(10) Patent No.: US 9,116,915 B1
(45) Date of Patent: Aug. 25, 2015

(54) INCREMENTAL SCAN

(75) Inventors: Nagaraja Mandya Lakshman, Karnataka (IM); Priyank Tiwari, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 231 days.

(21) Appl. No.: 13/434,348

(22) Filed: Mar. 29, 2012

(51) Int. Cl.
*G06F 17/30* (2006.01)
*G06F 11/14* (2006.01)

(52) U.S. Cl.
CPC ...... *G06F 17/30233* (2013.01); *G06F 11/1435* (2013.01); *G06F 17/30212* (2013.01)

(58) Field of Classification Search
CPC .................... G06F 17/30233; G06F 17/30221; G06F 17/30212; G06F 11/1435
USPC ......... 707/201, 609, 694, 652, 828, 711, 805; 709/217; 711/13; 726/24
See application file for complete search history.

(56) References Cited

U.S. PATENT DOCUMENTS

| | | | | |
|---|---|---|---|---|
| 4,005,415 | A * | 1/1977 | Kossiakoff et al. | 342/90 |
| 5,402,532 | A * | 3/1995 | Epstein et al. | 345/422 |
| 7,246,142 | B2 * | 7/2007 | Sexton et al. | 1/1 |
| 7,546,432 | B2 * | 6/2009 | Stacey et al. | 711/165 |
| 7,599,971 | B1 * | 10/2009 | Hagerstrom et al. | 1/1 |
| 7,603,397 | B1 * | 10/2009 | Hagerstrom et al. | 1/1 |
| 7,640,406 | B1 * | 12/2009 | Hagerstrom et al. | 711/159 |
| 7,783,615 | B1 * | 8/2010 | Compton et al. | 707/694 |
| 7,788,298 | B2 * | 8/2010 | Cho et al. | 707/805 |
| 7,788,303 | B2 * | 8/2010 | Mikesell et al. | 707/828 |
| 7,805,416 | B1 * | 9/2010 | Compton et al. | 707/694 |
| 7,854,006 | B1 * | 12/2010 | Andruss et al. | 726/24 |
| 8,055,724 | B2 * | 11/2011 | Amegadzie et al. | 709/217 |
| 8,055,850 | B2 * | 11/2011 | Gupta | 711/138 |
| 8,087,084 | B1 * | 12/2011 | Andruss et al. | 726/24 |
| 8,122,507 | B1 * | 2/2012 | Andruss et al. | 726/24 |
| 8,135,763 | B1 * | 3/2012 | Compton et al. | 707/822 |
| 8,170,985 | B2 * | 5/2012 | Zimran et al. | 707/609 |
| 8,205,261 | B1 * | 6/2012 | Andruss et al. | 726/24 |
| 8,214,334 | B2 * | 7/2012 | Mikesell et al. | 707/652 |
| 8,316,008 | B1 * | 11/2012 | Kohli | 707/711 |
| 8,339,990 | B1 * | 12/2012 | Tzamaloukas | 370/254 |
| 8,375,451 | B1 * | 2/2013 | Andruss et al. | 726/24 |
| 8,402,544 | B1 * | 3/2013 | Soubramanien et al. | 726/24 |
| 8,443,445 | B1 * | 5/2013 | Andruss et al. | 726/24 |
| 8,544,096 | B2 * | 9/2013 | Van Brabant | 726/24 |
| 8,549,220 | B2 * | 10/2013 | Beardsley et al. | 711/113 |
| 8,739,285 | B1 * | 5/2014 | Andruss et al. | 726/24 |
| 2002/0169940 | A1 * | 11/2002 | Kyler | 712/1 |
| 2005/0149749 | A1 * | 7/2005 | Van Brabant | 713/200 |
| 2006/0182115 | A1 * | 8/2006 | Shah et al. | 370/395.4 |

(Continued)

*Primary Examiner* — Jean M Corrielus
(74) *Attorney, Agent, or Firm* — Staniford Tomita LLP

(57) ABSTRACT

This disclosure relates to a method, article of manufacture, and apparatus for scanning data. In some embodiments, this includes examining attributes of a first directory, wherein the attributes include at least one from a group comprising a next tentative scan date, a modified time, and a dirty indicator, determining if the dirty indicator has been set, if the dirty has been set, scanning files in the first directory, if the dirty indicator has not been set, determining if the first directory has been modified, if the first directory has not been modified, determining if the next tentative scan date equals to a system date, if the next tentative scan date equals to the system date, scanning the files, if the next tentative scan date does not equal to the system date, examining attributes of a second directory, and if the first directory has been modified, scanning the files.

11 Claims, 3 Drawing Sheets

Start
Obtaining a file? 310
Yes
Opening the file 315
Reading file attributes and extended attributes 320
Evaluating against policies 325
Closing the file 335
Any exceptions? 340
Yes
Indicate directory dirty 370
No
Performing file migration related tasks 345
File next scan date earlier than NextTentativeScanDate 350
Yes
Setting NextTentativeScanDate to file next scan date 355
No
Storing NextTentativeScanDate 360
Storing system directory modified to ModifiedTime 365
End

(56) References Cited

U.S. PATENT DOCUMENTS

2006/0212746 A1* 9/2006 Amegadzie et al. .............. 714/6
2007/0094269 A1* 4/2007 Mikesell et al. ................ 707/10
2007/0179990 A1* 8/2007 Zimran et al. ................ 707/201
2007/0266056 A1* 11/2007 Stacey et al. .................. 707/203
2007/0288527 A1* 12/2007 Chang et al. .................. 707/200
2008/0104129 A1* 5/2008 Chang et al. .................. 707/200
2009/0094698 A1* 4/2009 Nichols et al. .................. 726/24
2010/0121828 A1* 5/2010 Wang ............................ 707/694

* cited by examiner

INCREMENTAL SCAN

FIELD

The present invention relates generally to data systems and specifically to systems and methods of efficient data scanning during a migration.

BACKGROUND

File migration from primary storage to relatively low cost secondary storage is common in order to achieve cost effectiveness of storage systems. The process of file migration often involves identifying files that have met criteria specified in user defined policies.

For example, some criteria of a file migration policy may indicate that if a file is not accessed within a specific time frame, then the file is moved to a secondary storage. A motivating factor for employing such an age-based migration policy may be to remove less frequently accessed data in order to free up primary storage. When implementing a migration policy, checks of file attributes must be performed to determine whether a file meets or does not meet certain criteria specified in a migration policy. Such checks of file attributes and comparisons of multiple user defined migration policies against each file can be costly. Especially as storage systems grow large, a scan of the entire primary storage to retrieve a large number of files and read the attributes may become prohibitively time consuming and resource draining.

There is a need, therefore, for an improved method or system that would permit efficient analysis of files for migration purposes, without adversely affecting storage systems performance or over taxing storage systems resources.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
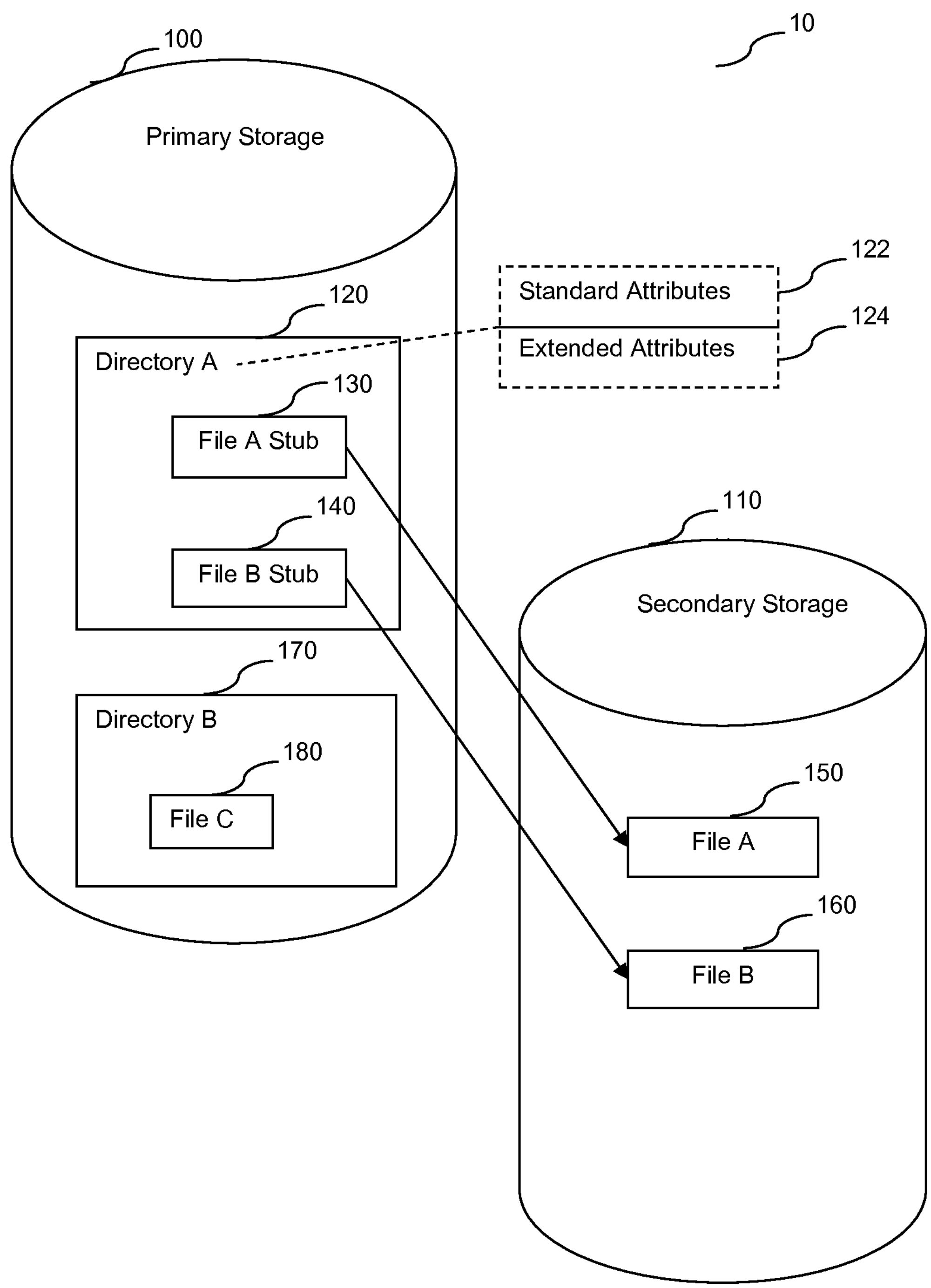
FIG. 1 is a diagram of a data storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are methods and systems to efficiently manage file migration in data storage. Conventional methods to manage data storage include migrating infrequently accessed files to appropriate storage systems according to user defined policies. This kind of file migration between different storage systems is generally known as policy-based file migration.

User defined policies may be based on file attributes including last access date, file size, file type, or file owner among other. Flexible policy choices may also enable a user to include or exclude files whose attributes meet certain criteria. For example, a user may specify file types such as .txt, .pdf, or .doc to be migrated, and/or any files larger than 10 MB in size not to be migrated, and/or any files older than 5 days to be migrated. In addition to defining policies based on file attributes, policies may also be defined based on directory attributes. An example of a policy-based file migration application is DiskXtender, a product available from EMC Corporation.

When a migration policy is based on the creation or last modification date and/or time of a file, such policy is an age-based policy. Age-based policies may be configured to meet regulatory requirements and/or to lower cost of ownership. For example, during the first few days of a file creation, the file may be accessed frequently. After a while, the file may not be accessed as frequently. In some cases, the file may only need to be accessed once in a few years. Instead of leaving an inactive file on relatively expensive primary storage claiming space, an age-based policy may be defined to accommodate the move of the file to a relatively low cost secondary storage after the first few days of its creation. In case of regulatory requirements of retaining certain files for a specific period, an age-based policy may also be defined to identify and migrate these files to a safe and secure secondary storage.

In order to determine which files may qualify for migration according to user defined policies, a scanning process may be necessary to match policies with file attributes. The scanning process may be configured to run periodically or may start by a user manually. During a scan, files may be opened. The file attributes may then be read and compared with user defined policies. If there is a match between the file attributes and a policy, migration related tasks may be performed on the file. Since file operations such as opening and closing may be time consuming and may impose constraints on system resources, the scanning process may also run in the background and/or during off peak hours to be less disruptive.

In some embodiments of the present invention, an efficient incremental scan may be used to improve the efficiency of the scanning process, as shown in FIG. 1. FIG. 1 illustrates an exemplary storage system 10 containing Primary Storage 100 and Secondary Storage 110. Primary Storage 100 may contain Directory A 120 and Directory B 170. Directory A 130 main contain File A 150 and File B 160. Directory B 170 may contain File C 180. Directories in storage system 10 in some embodiments may have Extended Attributes 124 in addition to Standard Attributes 122 generated by various operating systems. Extended Attributes 124 may contain fields to indicate whether a directory has files that need to be scanned.

Though FIG. 1 depicts only one Primary Storage 100 and one Secondary Storage 110, storage system 10 may include multiple storage devices. Primary Storage 100 and Secondary Storage 110 each in turn may include one or more disks, with each disk containing a different portion of data stored on Primary Storage 100 and/or Secondary Storage 110. The storage space in Primary Storage 100 and/or Secondary Storage 110 may also be apportioned pursuant to a file system, or may be logical or virtual (i.e. not corresponding to underlying physical storage) or may be subdivided into a plurality of volumes or logical devices. The logical devices may or may not correspond to the physical storage space of the disks. Thus, for example, a physical storage device may contain a plurality of logical devices or, alternatively, a single logical device could span across multiple physical devices.

Primary Storage 100 and/or Secondary Storage 110 may be configured to access any combination of logical devices independent of the actual correspondence between the logical devices and the physical devices. Secondary Storage 110 may be provided as a stand-alone device coupled relatively directly to Primary Storage 100 or, alternatively, Secondary Storage 110 may be part of a storage area network that includes a plurality of other storage devices as well as routers, network connections, etc. The system described herein may be implemented using software, hardware, and/or a combination of software and hardware where software may be stored in an appropriate storage medium and executed by one or more processors.

During a migration based on user defined policies in accordance with some embodiments, files may be moved from Primary Storage 100 to the relatively less expensive Secondary Storage 110. Following the migration, files in Primary Storage 100 may be replaced with relatively small sized stubs, which may contain attributes of the files and point to the location of files stored on Secondary Storage 160. For example, File A Stub 130 may be placed in Directory A 120 and may point to File A 150 on Secondary Storage 110. Similarly, File B Stub 140 may be placed in Directory A 120 and may point to File B 160 on Secondary Storage 110. When a user needs to access these already migrated files, the stubs such as File A Stub 130 and File B Stub 140 may be used to locate File A 150 and File B 160 on Secondary Storage 110.

In the exemplary storage system 10, File A Stub 130 and File B Stub 140 may have been inactive for a while since a previous scan. File C 180 may be created in Directory B 170 after a previous scan. Conventional scanning methods may still open all three files and examine the file attributes before determine that only File C 180 may qualify for an age-based migration. Due to the unnecessary file operations such as file opening, file attributes examining, and file closing, these conventional methods may be too resource intensive or time consuming. The enhanced techniques described herein utilize Extended Attributes 124 determine whether a directory may contain files that need to be scanned. By checking Extended Attributes 124 of a directory prior to performing expensive file operations on files located in the directory, the current invention reduces the amount of unnecessary file operations and improves efficiency of the scanning process to facilitate file migration.

A directory's extended attribute structure in accordance with some embodiments may be as follows:

```
typedef struct_FOLDER_MIGRATION_INFO
{
    DWORD Version; //Extended attributes version
    FILETIME NextTentativeScanDate; //Next tentative scan date of the directory
    FILETIME ModifiedTime; //Directory last modified time
    DWORD Dirty; //Specifies that a directory is dirty
    DWORD Reserverd[4]; //Reserved for future use
} FOLDER_MIGRATION_INFO, *PFOLDER_MIGRATION_INFO;
```

Version in the above structure may contain a version number of the structure. This field may be used to maintain compatibilities across different versions of the software. NextTentativeScanDate may track next tentative or likely scan date of the directory. Dirty may indicate that the directory contains files that need to be scanned. Triggering events of the Dirty indicator may include raising exceptions during a scan. Dirty indicator may also be used as a workaround for unexpected behaviors during the scanning process.

ModifiedTime in the above structure may record last modified time of the directory after scanning the directory. In some operating systems, a directory may have Standard Attributes 132 such as name, path, and/or a system directory modified time among others. If a directory is changed after a previous scan due to activities such as adding a new file or modifying a file in the directory, the system directory modified time may change and differ from the ModifiedTime. The difference in ModifiedTime may indicate that a file scanning in the directory is necessary.

Figure 2:
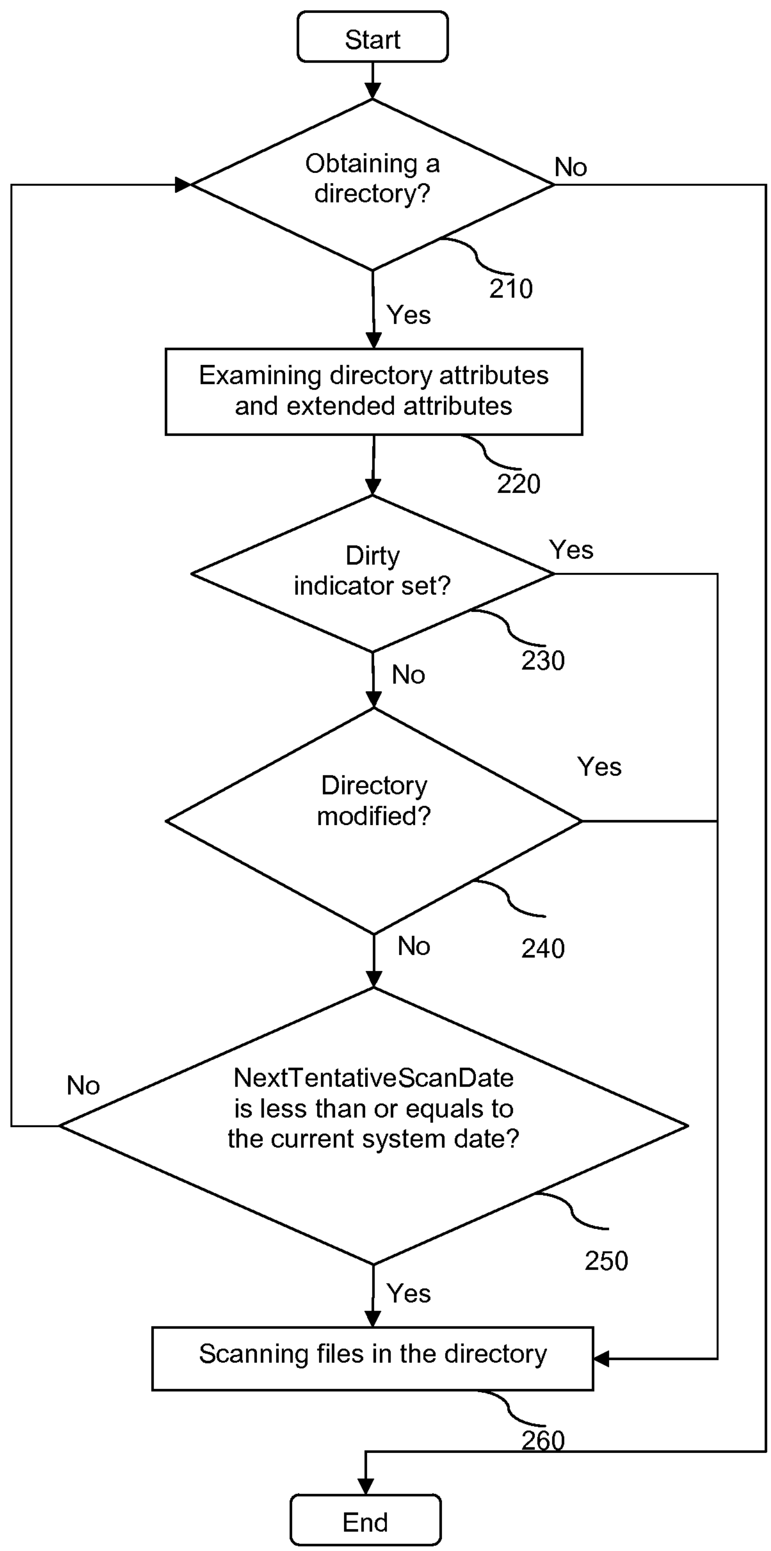
FIG. 2 is a diagram of the logical interaction within a data storage system in accordance with some embodiments.

FIG. 2 illustrates an incremental scan in accordance with some embodiments. In step 210, the scanning process may first read a directory from Primary Storage 100. If the directory reading in step 210 is successful, the directory's standard attributes and extended attributes may be examined in step 220. On the other hand, if the scanning process cannot obtain a directory in step 210, the incremental scan may end.

After examining the attributes and extended attributes of the directory in step 220, the scanning process may determine if the Dirty field in the extended attribute structure has been set in step 230. Dirty may indicate that the directory contains files that need to be scanned. Triggering events of the Dirty indicator may include raising exceptions during a scan. Dirty indicator may also be used as a workaround for unexpected behaviors during the scan. Upon a determination that the Dirty indicator has been set, files in the directory may be scanned in step 260. On the other hand, if Dirty indicator has not been set, the incremental scan may need to further analyze ModifiedTime and NextTentativeScanDate to determine if files in the directory need to be scanned.

In step 240, ModifiedTime field in the extended attribute structure may be compared with a system directory modified time to determine if the directory has been modified since a previous scan. In some embodiments, at the end of a scan of a directory, the system directory modified time may be recorded to ModifiedTime. In some operating systems, changes such as adding a new file to a directory or making changes to a file in a directory may impact the system directory modified time. As a result, if changes have been made to files in a directory since a previous scan, the system directory modified time may be difference from the value recorded in ModifiedTime. A detection of the difference may lead to step 260, a scan of files in the directory. On the other hand, if the directory has not changed since a previous scan, the incremental scan may need to further analyze NextTentativeScanDate to determine if files in the directory need to be scanned.

In step 250, the directory's NextTentativeScanDate may be compared with a current system date. If the NextTentativeScanDate is less than or equals to the current system date, files in the may be due for migration related tasks. Consequently, scanning files in the directory in step 260 may be necessary. On the other hand, if the incremental scan determines that the Dirty indicator is not set, the directory has not been modified since a previous scan, and the directory does not qualify for any user defined policy, the incremental scan may efficiently skip scanning files in the directory.

Figure 3:
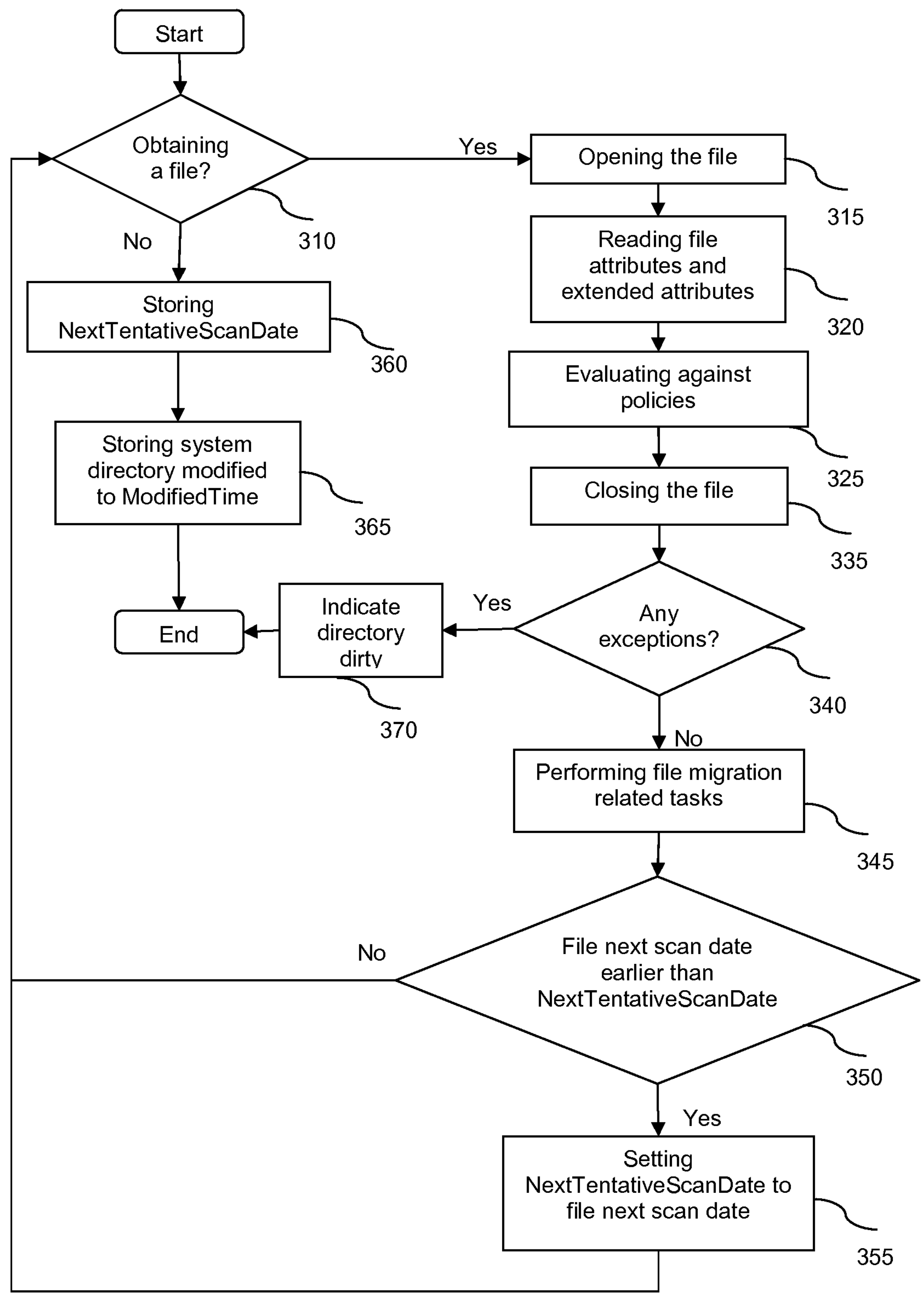
FIG. 3 is a flow chart illustrating a method to scanning data in accordance with some embodiments.

FIG. 3 illustrates one embodiment of a flowchart of operations for performing file scanning within a qualifying directory. Scanning files in a qualifying directory serve the purpose of determining which files may qualify for migration based on user defined policies. In addition, the file scanning process may also set directory extended attributes such as NextTentativeScanDate, Dirty and ModifiedTime. The directory extended attributes may then be used during next incremental scan of directories as illustrated in FIG. 2 to determine if a directory may contain qualifying files and need to be scanned.

In step 310, a file may be obtained for scanning. If the end of the directory is reached, directory extended attributes NextTentativeScanDate and ModifiedTime may be stored in step 360 and 365. Upon successfully obtaining the file, the file may be opened in step 315, and standard file attributes as well as extended attributes may be read in step 320. Similar to a directory, in some operating systems, a file may have standard attributes such as name, path, and/or a system file modified time among others. To facilitate migration related tasks, in some embodiments, a file may also be associated with file extended attributes to track information such as retention period and next scan date among others. During the file scanning process, in order to determine whether the file may qualify for any policy-based migration, an evaluation of file attributes as well as extended attributes may be performed in step 325 against user defined policies.

For example, a user defined policy may require migrating all the .txt files that are at least 7 days old. On June 1st, file 1.txt may be created in directory A. Evaluating 1.txt against the policy, the file scanning process may determine that 1.txt has the matching attribute of file type .txt. The file scanning process may further determine that according the policy, since 1.txt was created on June 1st, the next scan date for migration related tasks may be June 7th. Upon completion of a file evaluation in step 325, the file may be closed in step 335. In case of any exceptions raised during file opening, evaluation and closing, the Dirty indicator may be set in step 370. Once the Dirty indicator is set, the file scanning process in the directory may end to avoid unnecessary further scanning of other files in the same directory.

Having evaluated the file attributes and/or extended attributes without exception, in step 345, migration related tasks may be performed based on the evaluation result. Migration related tasks may include move, purge, and/or delete among others. For example, some files may qualify for criteria in a move policy, be written to a move list, and be moved later. A move list may contain file path as well as the move destination device information. Similarly, some files may qualify for criteria in a purge policy and may be written to a purge list to be purged later. A purge list may contain file path information. Some files may qualify for criteria in a delete policy and may be deleted. Yet other files may qualify for criteria in an index policy and may be written to an index transaction log.

Upon completion of performing migration related tasks, in step 350, directory's NextTentativeScanDate may be compared with the file's next scan date obtained during the evaluation step 325. The comparison may result in setting an earlier date to NextTentativeScanDate. When the end of the directory is reached, all the comparisons performed during the file scanning in the directory may result in having the earliest next scan date among all the files in the directory to NextTentativeScanDate.

For example, a user may define policies as follows.

Policy 1: migrate all the .txt files that are 7 days old.

Policy 2: migrate all the .rtf files that are 5 days old

Policy 3: migrate all the .doc files that are 3 days old.

On June 1, directory A may contain three newly created files, 1.txt, 2.rtf, and 3.doc. After the evaluation step in 325, based on Policy 1, 1.txt may have a next scan date of June 7. Similarly, 2.rtf may have a next scan date of June 5 based on Policy 2, and 3.doc may have a next tentative scan date of June 3 based on Policy 3 respectively. In step 350, directory A's NextTentativeScanDate may be first compared with June 7, the next scan date of file 1.txt. In case the directory's NextTentativeScanDate is not as recent as June 7, the directory's NextTentativeScanDate may be set to the June 7 in step 355. Subsequently, NextTentativeScanDate may be compared with and set to the next scan date of 2.rft and 3.doc. After scanning all the files in directory A, June 3 may be the value stored as NextTentativeScanDate in step 360, since June 3 is the earliest next scan date among files 1.txt, 2.rtf, and 3.doc.

In some embodiments, incremental scan may be used in conjunction with a full scan of all files following the steps illustrated in FIG. 3. During the full scan, the next scan date of each file may be determined based on user defined policies. When file scanning process as illustrated in FIG. 3 reaches the end of each directory, the directory extended attributes such as NextTentativeScanDate, Dirty and ModifiedTime among others may be set. Following a full scan, each directory may have extended attributes ready to provide a user the option of running an incremental scan. The efficient incremental scan may then pick a directory and evaluate its extended attributes to determine if files in the directory may be further scanned. In case of a qualifying directory, the files in the directory may be processed following the steps as illustrated in FIG. 3. During this file scanning process again, directory extended attributes such as NextTentativeScanDate, ModifiedTime and Dirty may be calculated and updated.

Using incremental scan to facilitate migration has the benefit of reducing the number of expensive file operations. Conventional scanning methods to facilitate migration may be time consuming due to unnecessary file opening and attribute checking of infrequently accessed files. For example, an age-based policy may require migrating files that are older than five days after its creation. A file 1.txt is created on day 1. During a scan on day 2, 1.txt would not qualify for migration since the file is only one day old. Similarly, 1.txt would not qualify for migration on day 3-5. Not until day 6, 1.txt may qualify for the age-based migration policy. Any file operations to match the file attributes with policies prior to day 6 may be redundant and may consume unnecessary system resources. The enhanced techniques described, in some embodiments, make use of a directory extended attributes check prior to performing expensive file operations.

During an incremental scan, directories that do not contain qualifying files may be skipped altogether for scanning. The benefit of incremental scanning is more obvious as data sets grow larger. In particular, for the customers having large data sets, the data modification rate may be only a fraction of the overall data. As a result, the modified directories containing modified data may also be a small fraction within the overall directory structure. When only a fraction of the directories containing data sets qualified for scanning, the enhanced techniques described may avoid the expensive file operations and improve the efficiency significantly.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for incrementally scanning data, comprising:

defining, for a first directory containing files, an extended attribute structure having a plurality of fields storing attributes related to modification of the files;

after a previous scan to set attributes in the extended attribute structure including a next tentative scan date, a modified time, and a dirty indicator indicating an exception happened during the previous scan and providing a workaround for unexpected behavior of the previous scan, examining during the incremental scan the attributes of the first directory;

determining if the dirty indicator has been set, the dirty indicator contained in a field of the extended attribute structure;

if the dirty indicator has been set, scanning the files in the first directory;

if the dirty indicator has not been set, determining if the first directory has been modified;

if the first directory has not been modified, determining if the next tentative scan date equals to a system date;

if the next tentative scan date equals to the system date, scanning the files;

if the next tentative scan date does not equal to the system date, examining attributes of a second directory; and if the first directory has been modified, scanning the files in the first directory.

2. The method as recited in claim 1, wherein scanning the files includes opening a first file of the files;

reading file attributes of the first file from the extended attribute structure;

evaluating the file attributes based on at least one policy;

closing the first file;

determining if an exception has taken place;

if the exception has taken place, setting the dirty indicator;

if no exception has taken place, performing a migration of the first file based on the at least one policy;

comparing the next tentative scan date with a scan date of the first file; and in the event that the next tentative scan date is not as recent as the scan date of the first file, setting the next tentative scan date to the scan date of the first file.

3. The method as recited in claim 2, wherein opening a first file of the files includes determining if an end of the first directory has been reached;

based on the determination that the end of the first directory has been reached, updating the attributes;

based on the determination that the end of the directory has not been reached, opening a second file of the files; reading file attributes of the second file; evaluating the file attributes based on a policy; closing the second file; determining if an exception has taken place; if the exception has taken place, setting the dirty indicator; if no exception has taken place, performing a migration of the second file based on the policy; and calculating the next tentative scan date.

4. The method as recited in claim 3, wherein updating the attributes includes storing the next tentative scan date in another field of the extended attribute structure; and storing a system directory modified time to the modified time in yet another field of the extended attribute structure.

5. The method as recited in claim 2, wherein the at least one policy includes at least one file age-based policy.

6. The method of claim 2, wherein the previous scan is a full scan of the files to set the attributes.

7. The method as recited in claim 1, wherein determining if the first directory has been modified includes comparing the modified time with a system directory modified time;

in the event that the modified time is not the same as the system directory modified time, indicating the first directory has been modified; and in the event that the modified time is the same as the system directory modified time, indicating the first directory has not been modified.

8. The method of claim 1 wherein the extended attribute structure comprises a plurality of fields storing respective attributes related to a time or status of modification of at least some of the files in the first directory.

9. The method of claim 8 wherein the extended attribute structure of the first directory is checked prior to performing any file operations on the files to determine whether the first directory contains files that need to be scanned.

10. A system for incrementally scanning data, comprising: a processor configured to define, for a first directory containing files, an extended attribute structure having a plurality of fields storing attributes related to modification of the files;

after a previous scan to set attributes in the extended attribute structure including a next tentative scan date, a modified time, and a dirty indicator indicating an exception happened during the previous scan and providing a workaround for unexpected behavior of the previous scan, examine during the incremental scan the attributes of the first directory;

determine if the dirty indicator has been set, the dirty indicator contained in a field of the extended attribute structure;

if the dirty indicator has been set, scan the files in the first directory;

if the dirty indicator has not been set, determine if the first directory has been modified;

if the first directory has not been modified, determine if the next tentative scan date equals to a system date;

if the next tentative scan date equals to the system date, scan the files;

if the next tentative scan date does not equal to the system date, examine attributes of a second directory; and if the first directory has been modified, scanning the files in the first directory.

11. A computer program product for incrementally scanning data, comprising a non-transitory computer usable medium having machine readable code embodied therein for:

defining, for a first directory containing files, an extended attribute structure having a plurality of fields storing attributes related to modification of the files;

after a previous scan to set attributes in the extended attribute structure including a next tentative scan date, a modified time, and a dirty indicator indicating an exception happened during the previous scan and providing a workaround for unexpected behavior of the previous scan, examining during the incremental scan the attributes of the first directory;

determining if the dirty indicator has been set, the dirty indicator contained in a field of the extended attribute structure;

if the dirty indicator has been set, scanning the files in the first directory;

if the dirty indicator has not been set, determining if the first directory has been modified;

if the first directory has not been modified, determining if the next tentative scan date equals to a system date;

if the next tentative scan date equals to the system date, scanning the files;

if the next tentative scan date does not equal to the system date, examining attributes of a second directory; and if the first directory has been modified, scanning the files in the first directory.

* * * * *